(12) United States Patent
Yoshimi et al.

(10) Patent No.: US 8,147,961 B2
(45) Date of Patent: Apr. 3, 2012

(54) CARBURIZED METAL MATERIAL AND PRODUCING METHOD THEREOF

(75) Inventors: Kyosuke Yoshimi, Sendai (JP); Takeshi Matsuo, Yokohama (JP); Mitsuo Suzuki, Chuo-ku (JP); Takaaki Niinomi, Yokohama (JP); Yuichi Furukawa, Toyota (JP); Setsuyu Hayakawa, Aichi (JP)

(73) Assignees: Toyota Jidosha Kabushiki Kaisha, Toyota-shi (KR); MEC International Co., Ltd., Toyota (TW)

( * ) Notice: Subject to any disclaimer, the term of this patent is extended or adjusted under 35 U.S.C. 154(b) by 487 days.

(21) Appl. No.: 11/914,899

(22) PCT Filed: May 18, 2006

(86) PCT No.: PCT/JP2006/309958
§ 371 (c)(1),
(2), (4) Date: Dec. 3, 2008

(87) PCT Pub. No.: WO2006/123748
PCT Pub. Date: Nov. 23, 2006

(65) Prior Publication Data
US 2009/0117359 A1    May 7, 2009

(51) Int. Cl.
*B32B 9/00* (2006.01)
(52) U.S. Cl. ........................ 428/408; 428/457
(58) Field of Classification Search .......... 428/220, 428/323, 332, 408, 411.1, 457, 688, 689, 428/698; 427/11, 135, 189, 193, 227, 228, 427/249.1, 249.6, 249.7, 255.22, 287, 331, 427/372.2, 374.1, 375, 376.1, 427, 444, 522, 427/532, 545, 593; 148/206, 210, 223, 225, 148/227, 229, 236, 237, 240, 278, 316, 319, 320; 977/734, 842, 903

See application file for complete search history.

(56) References Cited

U.S. PATENT DOCUMENTS

| 1,408,686 | A | * | 3/1922 | Bertschy | 148/235 |
| 1,480,230 | A | * | 1/1924 | Tashiro | 148/236 |
| 1,706,356 | A | * | 3/1929 | Guthrie et al. | 148/217 |
| 2,819,992 | A | * | 1/1958 | Albrecht | 148/227 |
| 3,313,660 | A | * | 4/1967 | Vordahl | 428/565 |
| 5,958,523 | A | * | 9/1999 | Bradic | 427/509 |
| 6,723,279 | B1 | | 4/2004 | Withers et al. | |
| 6,790,242 | B2 | * | 9/2004 | O'Donnell et al. | 29/25.01 |

(Continued)

FOREIGN PATENT DOCUMENTS

CN    1 151 447 A    6/1997

(Continued)

OTHER PUBLICATIONS

Mochida et al., Carbonization of C60 and C70 fullerenes to fullerene soot, No Month 1995, Carbon, 33, p. 186-188.*

(Continued)

*Primary Examiner* — Timothy Speer
(74) *Attorney, Agent, or Firm* — Oblon, Spivak, McClelland, Maier & Neustadt, L.L.P.

(57) ABSTRACT

A metal material that is, without using expensive apparatus, carburized in a low temperature region where crystal grains do not grow so much, and a producing method of the metal material are provided. A metal material mainly containing iron, wherein a surface of the metal material is subjected to a carburization treatment by a treatment using fullerenes as a carbon source.

6 Claims, 3 Drawing Sheets

U.S. PATENT DOCUMENTS

| | | | |
|---|---|---|---|
| 6,844,068 B1 * | 1/2005 | Miyake et al. | 428/408 |
| 2005/0129803 A1 | 6/2005 | Umeda et al. | |
| 2006/0207540 A1 * | 9/2006 | Matsui et al. | 123/90.49 |
| 2008/0206444 A1 * | 8/2008 | Matsuo et al. | 427/11 |

FOREIGN PATENT DOCUMENTS

| | | |
|---|---|---|
| JP | 62-96663 | 5/1987 |
| JP | 5-169459 | 7/1993 |
| JP | A 10-096072 | 4/1998 |
| JP | A-2001-207252 | 7/2001 |
| JP | 2002-31040 | 1/2002 |
| JP | 2002-538906 | 11/2002 |
| JP | 2004-10923 | 1/2004 |
| JP | 2004-51836 | 2/2004 |
| JP | 2004-182771 | 7/2004 |
| JP | 2005-29873 | 2/2005 |
| JP | 2005-144566 | 6/2005 |

OTHER PUBLICATIONS http://www.merriam-webster.com/dictionary/carburize, Dec. 6, 2010.*

Extended Search Report issued Jun. 7, 2011 in Patent Application No. 06756355.1-1215 / 1892312.

* cited by examiner

CARBURIZED METAL MATERIAL AND PRODUCING METHOD THEREOF

TECHNICAL FIELD

The present invention relates to a metal material subjected to a carburization process with fullerene as a raw material and a producing method thereof, in particular, a metal material where, without using expensive apparatus, a carburization process is applied at a low temperature region where grains do not grow so much, a metal material covered with a carbon film and a producing method of the metal material.

BACKGROUND ART

As a surface treatment for improving the hardness and so on of an iron-based metal material, a carburization process where carbon atoms are dissolved up to a depth in the range of several tens micrometers to several millimeters from a surface is generally applied. As a carbon source thereof, in a solid carburization process, wood charcoal, graphite or the like is used, and, in a gas carburization process, a hydrocarbon gas, a natural gas or the like is used. However, in the solid carburization process, there is a problem in that, because a carbon source is low in the reactivity, it is necessary to heat over a rather long time at such a high temperature as 900° C. or more during the carburization and thereby metal grains become coarse to tend to deteriorate in the mechanical strength. On the other hand, the gas carburization process, though suitable for mass production, has a problem in that expensive apparatus is necessary.

Now, fullerene is a spherical molecule made of only carbon atoms, has a magnitude of one molecule of substantially 1 nm and is gathering attention because of high reactivity. The reason why the fullerene is high in the reactivity is in that, while other carbon materials such as graphite and the like are made of a fundamental structure that has relatively stable six-membered rings of carbons, the fullerene has five-membered rings higher in the reactivity other than the six-membered rings. Accordingly, in recent years, various studies are in progress of reactions between fullerene and organic compounds or the like.

As to a reaction between a metal and fullerene, for instance, patent literature 1 discloses that owing to a reaction between the outermost surface of a metal such as titanium or the like that tends to form a carbide and fullerene, a carbide containing fullerene is formed.

Patent literature 1: JP-T No. 2002-538906

Furthermore, the fullerene is a spherical molecule made of only carbon atoms and having a magnitude of one molecule of substantially 1 nm. The fullerene, not containing oxygen, hydrogen and nitrogen in a molecule, does not generate a pyrolysis gas even when it is heated to 300° C. or more. Furthermore, since the fullerene has, other than six-membered rings, five-membered rings high in there activity in a molecule, fullerenes, when heated, react with each other to form amorphous carbon. The formation of amorphous carbon is a phenomenon that is peculiar to the fullerene and cannot be found in other carbon materials such as graphite and so on.

As supposed from these, when a film made of fullerene is heated, without generating a pyrolysis gas, a dense amorphous carbon film made of only carbon is formed. The carbon film, having excellent properties such as the lubricity and so on, is a material useful in various kinds of applications including surface protection of a material and so on.

However, since, when a fullerene film is formed, usually, expensive apparatus such as a vacuum deposition device is necessary and since a thick film is very difficult to be formed, carbon films are not industrially produced from fullerene films.

As another general method of forming a film, there is a method called a thermal spraying method. In the thermal spraying method, powders of metal, ceramics or the like are heated to a high temperature to melt and adhere to a surface of a material to form a thick film. The thermal spraying method is an industrially very useful film-forming method. However, until now, a carbon material film obtained by the thermal spraying method is limited to a nickel-graphite thermal sprayed film. This is because a general carbon material such as graphite or carbon black lacks the crystallinity and does not melt and thereby a film cannot be formed by use of the thermal spraying. Furthermore, for ones familiar with a field of the thermal spraying, since the fullerene sublimates or burns under a high temperature, it is technical commonsense that the fullerene is not suitable for the thermal spraying.

On the other hand, it is proposed to prepare a film containing fullerene by means of the thermal spraying method. That is, patent literature 2 proposes to form, by a thermal spraying method, a coated film in which nanocarbons including fullerene are dispersed.

Patent literature 2: JP-A No. 2005-29873

DISCLOSURE OF THE INVENTION

Problems that the Invention is to Solve

However, in patent literature 1, the study remains only in carbide formed on the outermost surface of a metal, that is, a metal carburization process where carbon atoms are interstitially dissolved is not studied.

In this connection, a first object of the invention is to provide a metal material that is, without using expensive apparatus, carburized in a low temperature region where crystal grains do not grow so much, and a producing method of the metal material.

Furthermore, the patent literature 2 discloses a method where, in order to make nanocarbons exert "a ball bearing-like function", on a surface of a matrix such as metal or resin, powder-like nanocarbons per se are dispersed. However, there is an inconvenience that, when a thick film of fullerenes is prepared and the fullerenes are reacted with each other, a smooth carbon film cannot be formed.

In this connection, a second object of the invention is to provide a smooth carbon film that is, without using expensive apparatus such as a vacuum vapor deposition unit, formed with fullerenes as a raw material, and a producing method thereof.

Means for Solving the Problems

In what follows, the invention will be described. In order to promote the understanding of the intention, reference numerals of attached drawings are shown within brackets. However, the invention is not restricted to exemplified embodiments.

Summaries of the invention are as follows.

1. A metal material mainly containing iron (10), wherein a surface of the metal is subjected to a carburization process by a treatment using fullerenes as a carbon source (first invention).

2. The metal material mainly containing iron of the 1, wherein the carburization process is carried out under a temperature environment of 300° C. or more and 900° C. or less.

3. The metal material mainly containing iron of the 1 or 2, wherein, after the carburization process, a quenching process is further carried out.

4. The metal material mainly containing iron of any one of the 1 through 3, which comprises, on the carburized surface, an amorphous carbon layer of a modified fullerenes.

5. A metal material mainly containing iron (10), which comprises: a surface carburized layer (2) having a higher carbon concentration than a center portion of the material; and an amorphous carbon layer on the outermost surface of the material (second invention).

6. The metal material mainly containing iron of any one of the 1 to 5, wherein as the fullerenes, granules of fullerenes having an average particle diameter in the range of 10 μm to 5 mm are used as a raw material.

7. A producing method of a metal material mainly containing iron, which comprises a carburization process using fullerenes as a carbon source (third invention).

8. The producing method of a metal material of the 7, wherein the carburization process is carried out under a temperature environment of 300° C. or more and 900° C. or less.

9. The producing method of a metal material of the 8, wherein after the carburization process a quenching process is further carried out.

10. A carbon film which is film-formed by a thermal spraying process using granules of fullerenes having an average particle diameter in the range of 10 μm to 5 mm, as a raw material, (fourth invention).

11. A preparation method of a carbon film, which comprises forming a film by a thermal spraying method using granules of fullerenes having an average particle diameter in the range of 10 μm to 5 mm as a raw material.

Here, the "fullerene" means a carbon cluster having a closed-shell structure. Furthermore, the "fullerenes" is a concept that widely includes not only the fullerene but also fullerene derivatives that have an attached substitution group or include metal or a molecule inside thereof. As the number of carbons of fullerenes applicable in the invention, without particularly restricting, specifically, 60, 70, 76, 78, 82, 84, 90, 94 and 96 can be cited. Furthermore, the "surface" is a concept that includes not only the outermost surface of a metal material (10) mainly containing iron but also a surface vicinity of a metal material (10) mainly containing iron, in which a carburized layer where carbon atoms are interstitially dissolved due to a carburization process is formed (hereinafter, in some cases, referred to as a "surface carburized layer" or simply as a "carburized layer"). A specific example of a thickness (depth) of the surface carburized layer is substantially in the range of 1 μm to 5 mm.

Still furthermore, the metal material mainly containing iron (hereinafter, in some cases, referred to as an "iron-based metal material") is a concept that includes, other than so-called pure iron, general steel materials including alloy steels and so on. In the invention, when an alloy steel is used as an iron-based metal material (1) as a host material that is carburized, specific examples of elements, other than iron, contained in the alloy steel include C, N, P, S, Si, Mo, Ni, Cr, Cu, Mn, Zn, Al, Ti, W, V, Ta, Nb, Co, Zr, Hf and so on. That is, alloy steels containing iron, the elements and/or compounds containing the elements and inevitable impurities can be formed. In addition, the carburization process involving the invention, as far as it is carried out in a mode where the fullerenes are in contact with a surface of the metal material (1) as a host material, is not particularly restricted in the mode. In what follows as well, the same is applied.

Here, "a carburization process being carried out under a temperature environment of 300° C. or more and 900° C. or less" means that a heating process for forming a carburized layer on a surface of the iron-based metal material (1) as a host material is carried out under a temperature environment of 300° C. or more and 900° C. or less.

Here, the amorphous carbon layer in the invention indicates a layer that is formed when film-like fullerenes that did not react with the iron-based metal material (1) as a host material when the carburization process was applied react with each other to modify and means a layer made of a material in which, in Raman spectrum measurement, peaks derived from original fullerenes are not observed. The amorphous carbon layer involving the invention is preferably in a mode where, in the Raman spectrum measurement, a broad peak is observed in the vicinity of 1200 to 1600 cm$^{-1}$.

Here, the "surface carburized layer (2)" means a layer that is formed by interstitially dissolving carbon atoms owing to a carburization process of the iron-based metal material (1) as a host material and is specifically a range, by a vertical distance from the outermost surface of the iron-based metal material (1) as a host material, up to 5 μm, preferably 10 μm and more preferably 50 μm. Furthermore, the "center portion" in the "carbon concentration being higher than that of a center portion" means a center of a section when the metal material (10) mainly containing iron is cut perpendicular to a lamination direction of the surface carburized layer (2). A carbon concentration is measured in such a manner that, in a cross-sectional surface that is mirror polished with alumina after the cutting, a carbon atom distribution is measured by use of an electron probe microanalyzer (EPMA). As a method of measuring a carbon concentration, any one of a point analysis method where a carbon concentration of the center portion and a carbon concentration of a surface carburized layer (2) are compared, a line analysis method where a carbon concentration distribution from a surface carburized layer (2) to the center portion is measured and an area analysis where a whole distribution of the carbon concentration is two-dimensionally observed, can be used.

Here, "a carburization process being carried out under a temperature environment of 300° C. or more and 900° C. or less" means that a heating process for forming a carburized layer on a surface of the iron-based metal material (1) as a host material is carried out under a temperature environment of 300° C. or more and 900° C. or less.

Here, the "carburization process being carried out under an inert atmosphere" means that a heating process for forming a carburized layer on a surface of the iron-based metal material (1) as a host material is carried out under an inert atmosphere typical in a nitrogen atmosphere, an argon atmosphere and so on. Furthermore, the "carburization process being carried out under a reducing atmosphere" means that a heating process for forming a carburized layer on a surface of the iron-based metal material (1) as a host material is carried out under a reducing atmosphere typical in a hydrogen atmosphere, a nitrogen/hydrogen atmosphere and so on. Still furthermore, from the viewpoint of enabling to form an amorphous carbon layer on a surface of the iron-based metal material (1) as a host material, a temperature of the carburization process (heating process) carried out under an inert atmosphere or a reducing atmosphere is preferably set at least at 300° C. or more. In addition to the above, from the similar viewpoint, the upper limit temperature is set preferably at 1200° C. or less and more preferably at 900° C. or less.

Furthermore, the present inventors, after studying hard to achieve the second object, found that, when fullerenes having a particular particle size are used in the thermal spraying method, a carbon film can be obtained with the fullerenes as a raw material.

Advantage of the Invention

According to a first invention, since fullerenes higher in the reactivity than that of wood charcoal are used as a carbon source, a carburization process can be applied at a temperature lower than ever. When the carburization process can be carried out at a temperature lower than ever, crystal grains can be inhibited from overgrowing and thereby the mechanical strength of the carburized iron-based metal material (10) can be improved. Furthermore, a mode of the carburization process involving the invention, as far as it can be carried out in a mode where the fullerenes and the metal material (1) as a host material are in contact, is not particularly restricted; accordingly, without using large scale apparatus, the carburization process can be applied. As the result, according to the first one of the inventions, without using expensive apparatus and with the crystal grains inhibited from growing, the iron-based metal material (10) can be provided.

Furthermore, in the first invention, when the carburization process is carried out under a temperature environment of 300° C. or more and 900° C. or less, crystal grains of the iron-based metal material (10) can be effectively inhibited from growing.

In addition, in the first invention, when the carburized metal material is subjected to a quenching treatment, the crystal structure can be controlled and thereby the iron-based metal material (10) can be heightened in the mechanical strength.

Furthermore, in the first invention, when, on a surface of the carburized iron-based metal material (10), an amorphous carbon layer where the fullerenes is modified, is provided, since the amorphous carbon layer is excellent in the adhesiveness with a surface of the iron-based metal material (10), the layer can be allowed working as a surface protective layer of the iron-based metal material (10).

According to a second invention, since a surface carburized layer (2) that is higher in the carbon concentration than a center portion thereof is provided, a surface is hardened and an amorphous carbon layer that becomes a surface protective layer excellent in the adhesiveness is present on the outermost layer; accordingly, an iron-based metal material (10) excellent in the endurance can be provided.

Furthermore, in the second invention, when an amorphous carbon layer is formed with fullerene having a particular particle diameter by use of a thermal spraying method, while carburizing, simultaneously, an amorphous carbon layer can be formed.

Furthermore, according to a third inventions since, as a carbon source, fullerenes more active than wood charcoal or the like are used, at a temperature lower than ever and without using large scale apparatus, the carburization process can be applied. Accordingly, according to the third invention, a producing method of the iron-based metal material (10), in which without using expensive apparatus, crystal grains can be inhibited from growing, can be provided.

Furthermore, in the third invention, when the carburization process is carried out under a temperature environment of 300° C. or more and 900° C. or less, the growth of crystal grains of the iron-based metal material (10) produced through the carburization process involving the invention can be readily controlled.

In addition, in the third invention, when the carburized metal material is further subjected to a quenching treatment, a crystal structure of a metal material can be controlled. Accordingly, when the mode is adopted, a producing method of an iron-based metal material, by which an iron-based metal material (10) having high mechanical strength can be readily produced can be provided.

Furthermore, in the third invention, when the carburization process is carried out under an inert atmosphere or a reducing atmosphere, without using expensive apparatus used in a PVD method, a CVD method and so on, an amorphous carbon layer can be formed on a surface of the iron-based metal material (10). Accordingly, when the mode is adopted, a producing method of a carburized iron-based metal material provided with a surface protective layer can be provided.

Furthermore, according to a fourth invention, without using expensive apparatus like vacuum deposition apparatus, only by thermally spraying fullerenes, a smooth carbon film can be formed. That is, high quality carbon films can be supplied readily at low cost. The fullerenes as a raw material react with each other by energy or heat at the time of thermal spraying and are converted completely or almost completely into amorphous carbon. Accordingly, the obtained carbon film is an almost complete amorphous carbon film. The carbon film is useful as a surface protective film, a lubricant film and so on.

Such actions and advantages of the invention will be clarified from best modes for carrying out the invention that will be described below.

DESCRIPTION OF THE REFERENCE NUMERALS AND SIGNS

1: Iron-based metal material as a host material
2: Hardened layer (surface carburized layer)
10: Iron-based metal material

BEST MODE FOR CARRYING OUT THE INVENTION

A carburization process is one method of a surface treatment where a surface of a metal material is hardened and a solid carburization process that uses wood charcoal or the like, a gas carburization process that uses carbon monoxide gas, hydrocarbon gas or the like and so on are known. However, in the solid carburization process, since a high temperature is necessary to apply a carburization process, there is a problem in that crystal grains of the carburized material become coarser to deteriorate in the mechanical strength of the material. On the other hand, when a gas carburization process is applied, there is a problem in that expensive apparatus is necessary; accordingly, the cost of the carburization process becomes high. In this connection, a carburization process that can, while suppressing the producing cost low, obtain high strength carburized material is in demand.

The present inventors, after studying hard from such the viewpoints, found that, when fullerenes are used as a carbon source, even under a temperature environment lower than ever, an iron-based metal material can be carburized, and thereby the invention came to completion.

In what follows, the invention will be detailed based on embodiments shown in the drawings.

1. Iron-based Metal Material Involving the Invention

Figure 1:
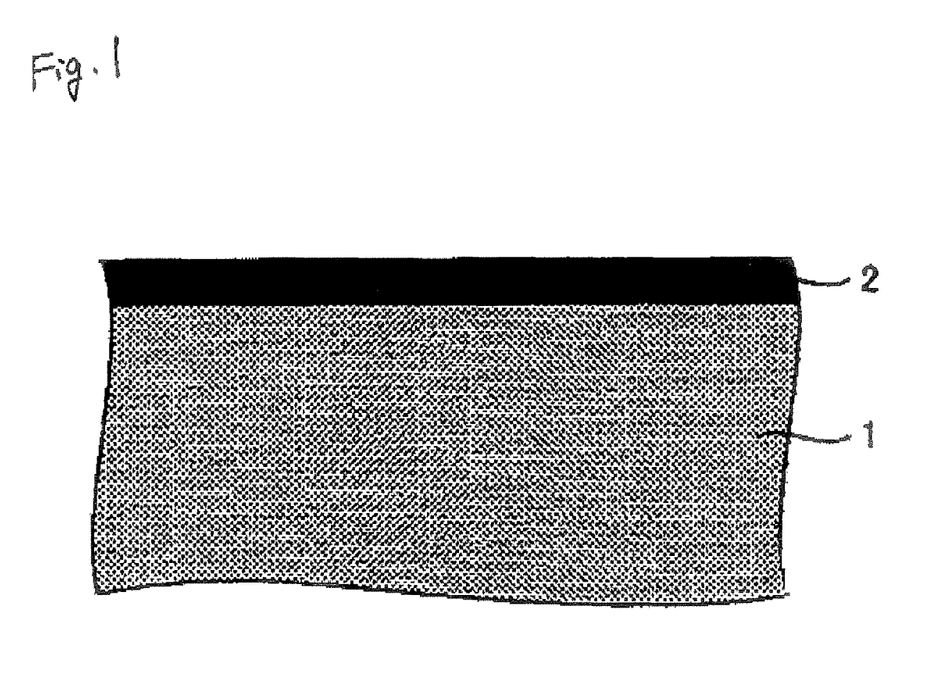
FIG. 1 is a sectional view schematically showing an example of a mode of an iron-based metal material involving the present invention.

FIG. 1 is a sectional view schematically showing an example of an embodiment of a metal material involving the invention. As shown in the drawing, in an iron-based metal material 10 involving the invention, when, on a surface of the iron-based metal material 1 as a host material, a carburization process is applied with the fullerenes as a carbon source, a hardened layer (hereinafter, in some cases, referred to as a "surface carburized layer") 2 is formed on a surface thereof.

Fullerenes, an iron-based metal material 1 as a host material to which a carburization process is applied, and an amorphous carbon layer, which are involved in the invention, will be described.

1.1. Fullerenes

The fullerene is a carbon cluster in which carbon atoms form a hollow closed structure. The number of carbon atoms of the fullerene applicable in the invention and forming the closed-shell structure is, without particularly restricting, usually, an even number in the range of 60 to 130. Specific examples of the fullerenes include, in addition to $C_{60}$, $C_{70}$, $C_{76}$, $C_{78}$, $C_{82}$, $C_{84}$, $C_{90}$, $C_{94}$ and $C_{96}$, higher carbon clusters having carbons more than the above. In the invention, the respective fullerenes and mixtures of the fullerenes can be appropriately used. The number of carbon atoms is not particularly restricted. However, from the viewpoint easy production, mixtures of the fullerenes or $C_{60}$ is preferably used. Furthermore, the fullerenes also can be used.

The "fullerenes" used in the invention is a concept that widely includes not only fullerene but also fullerene derivatives that have, for instance, an attached substituent group or include metal or molecule inside thereof. In what follows, for the sake of convenience, fullerene will be described as a typical example of the fullerenes.

In the next place, the fullerenes that are a raw material of a carbon film of the invention and a producing method of a carbon film by means of a thermal spraying process will be detailed below.

The fullerenes that are a raw material of a carbon film of the invention are preferably granules having particular particle sizes, and an average particle diameter is in the range of 10 μm or more and 5 mm or less. In particular, in the case of the thermal spraying being applied to carburize and to form an amorphous carbon film, when an average particle diameter of granules of the invention is smaller than 10 μm, the fullerene is burned or sublimed much by heat at the thermal spraying. This is because granules are light in weight and cannot be firmly fixed. Accordingly, there is an inconvenience in that the film formation does not proceed. On the other hand, when the average particle diameter thereof is excessively large, there are problems in that powders are transported with difficulty during the thermal spraying or a film cannot be densified.

An average particle diameter of the fullerene specified here is an average value obtained when, after a sample of fullerene dispersed in methanol is dropped on a filter, 2500 pieces are observed with an optical microscope on a volume basis. Furthermore, the "granule" is an aggregate of fine fullerene grains and can be obtained, for instance, when the fullerene dissolved in a solvent is evaporated to dryness or precipitated.

The granules of the fullerenes used in the invention can be controlled of grain diameters thereof by means of various known granulation methods. When one having a large grain diameter is necessary, powder is consolidated, molded, disintegrated and classified. As an example of a granulation method, a method where a pelletizing machine such as a drum pelletizing machine, a pelletizer, a compactor or an injection press is used to granulate, as needs arise, followed by disintegrating and classifying is cited.

1.2 Iron-based Metal Material as Host Material

A metal material mainly containing iron (hereinafter, in some cases, referred to as an "iron-based metal material") includes, in addition to so-called pure iron, general steel materials including alloy steels and so on. In the invention, when an alloy steel is used as an iron-based metal material (1) as a host material that is carburized, specific examples of elements, other than iron, capable of containing in the alloy steel include C, N, P, S, Si, Mo, Ni, Cr, Cu, Mn, Zn, Al, Ti, W, V, Ta, Nb, Co, Zr, Hf and so on. That is, alloy steels containing iron, the elements and/or compounds containing the elements and inevitable impurities can be formed. In addition, the carburization process involving the invention, as far as it is carried out in a mode where the fullerenes are in contact with a surface of the metal material (1) as a host material, is not particularly restricted in the mode.

In FIG. 1, a mode where a hardened layer 2 is formed on a surface of an iron-based metal material 1 as a host material is shown. In the invention, an iron-based metal material as a host material to which a carburization process is applied with fullerenes as a carbon source, as far as it is an iron-based metal material, is not particularly restricted. Specific examples thereof include so-called pure iron (including, other than iron, inevitable impurities), alloy steels and so on. In the invention, when an alloy steel is used as an iron-based metal material 1 as a host material, specific examples of elements that can be added to the alloy steel include C, N, P, S, Si, Mo, Ni, C, Cu, Mn, Zn, Al, Ti, W, V, Ta, Nb, Co, Zr, Hf and so on. When the iron-based metal material 1 as a host material is carburized, the iron-based metal material 10 involving the invention can be formed.

1.3. Amorphous Carbon Layer

On the outermost surface (on a surface of a hardened layer 2) of an iron-based metal material 10 shown in FIG. 1, an amorphous carbon layer (not shown in the drawing) may be further formed. The amorphous carbon layer is a layer formed when film-like fullerenes that are remained unused when a hardened layer 2 is formed and unreacted with an iron-based metal material (1) as a host material when a carburization process is applied, react with each other under a temperature environment of 300° C. or more to modify. In the amorphous carbon layer involving the invention, which means a layer made of a substance where, in the Raman spectrum measurement, a peak derived from original fullerenes is not observed, when, in the Raman spectrum measurement, a peak derived from original fullerenes is not observed, the mode thereof is not particularly restricted. However, a mode where, in the Raman spectrum measurement, a broad peak is observed in the vicinity of 1200 to 1600 $cm^{-1}$ is preferred.

2. Structure of Carburized Metal Material

A metal material 10 involving the invention, which is mainly containing iron, is a metal material that has a surface carburized layer 2 of which a carbon concentration is higher than that of a center portion; and an amorphous carbon layer on the outermost surface thereof. The "center portion" in the "carbon concentration being higher than that of a center portion" means a center of a cross section when the metal material (10) mainly containing iron is cut perpendicular to a lamination direction of the surface carburized layer (2). The surface carburized layer 2 means a layer formed when carbon atoms make an interstitial solid solution owing to the carburization process, specifically a range inside up to, by a vertical distance from the outermost surface of the iron-based metal material 1 as a host material, 1 µm, preferably 10 µm, and more preferably 50 µm. The upper limit of a thickness (depth) of the layer is 5 mm and preferably 1 mm. Furthermore, the "outermost surface of a material" means a surface of a metal material 1 as a host material and does not mean a surface of an amorphous carbon layer. That is, the "outermost layer of a material" is a boundary surface between the metal material 1 as a host material and the amorphous carbon layer.

When carbon concentrations of a center portion of the metal material 10 mainly containing iron and a surface carburized layer 2 thereof are compared, after the iron-based metal material 10 is cut and a cross-sectional surface thereof is mirror polished with alumina, a carbon atom distribution is measured by use of an electron probe microanalyzer (EPMA). At this time, any one of a point analysis method where a carbon concentration of the center portion and a carbon concentration of a surface carburized layer 2 are compared, a line analysis method where a carbon concentration distribution from the surface carburized layer 2 to the center portion is measured and an area analysis where a whole distribution of the carbon concentration is two-dimensionally observed may be used. Furthermore, a film thickness of the amorphous carbon layer is, without particularly restricting, 1 µm or more and preferably 5 µm or more.

An example of a producing method of the iron-based metal material 10 involving the invention will be described below.

3. Producing Method of Iron-based Metal Material

Figure 2:
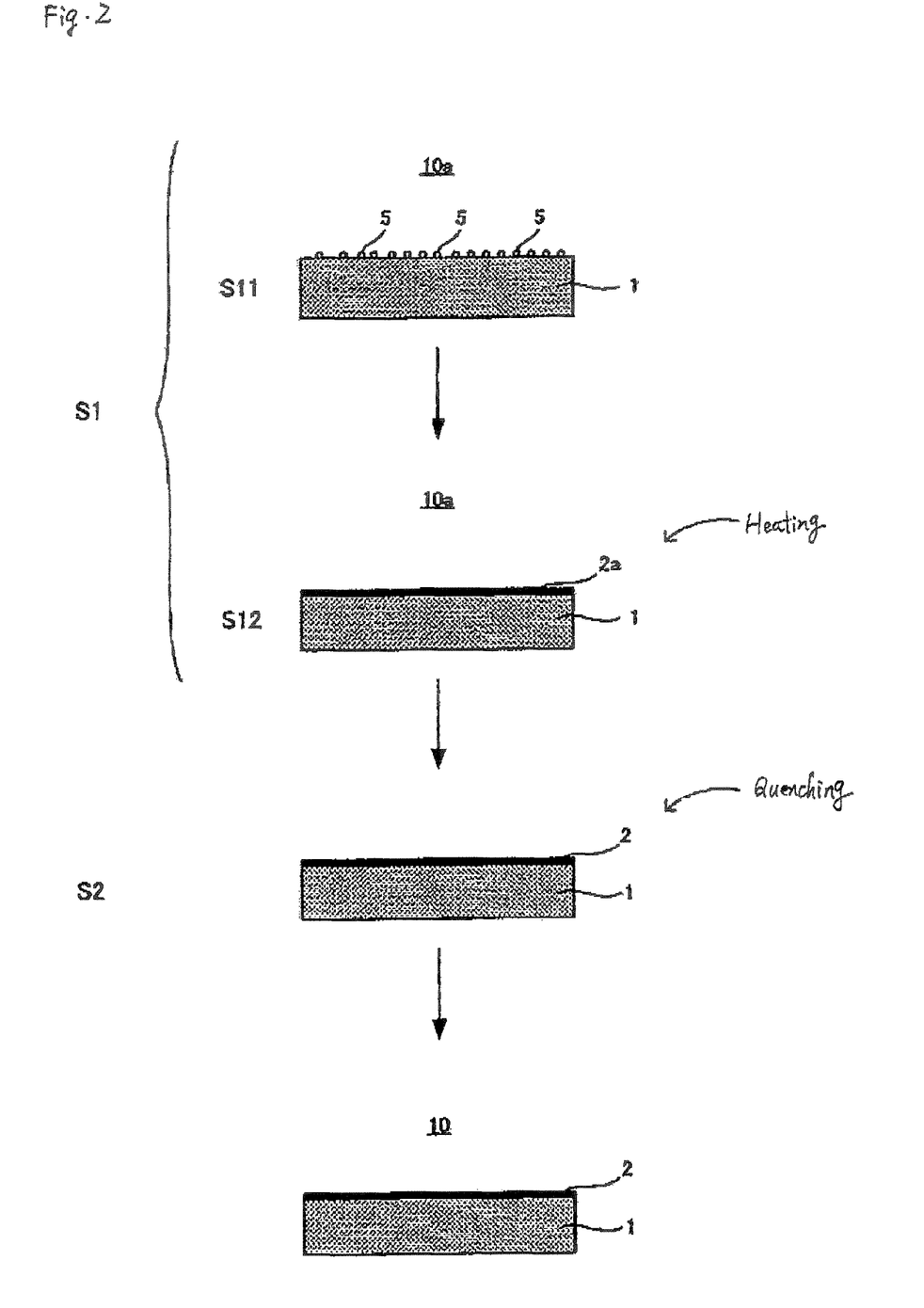
FIG. 2 is a process chart showing a producing method of an iron-based metal material involving an embodiment of the invention (In the drawing, an amorphous carbon layer is omitted from showing.).

FIG. 2 is a process chart showing a producing method involving the invention of an iron-based metal material 10. As shown in the drawing, a producing method of the invention includes a carburization step S10 and a quenching step S20. In what follows, among the fullerenes, fullerene will be described as a representative.

3.1. Carburization Step (Step S10)

A carburization step S10 involving the invention includes a carbon source contact step S11 where the fullerene as a carbon source is brought into contact with a surface of an iron-based metal material 1 as a host material such as low carbon steel to form low carbon steel with fullerene; and a heating step S12 where the low carbon steel is heated to form a carburized layer 2 on a surface thereof.

(i) Carbon Source Contact Step (Step S11)

In the invention, a method of bringing fullerene into contact with a surface of an iron-based metal material 1 as a host material (hereinafter, in some cases, simply referred to as "host material"), without particularly restricting, as far as it can bring the fullerene into contact with the host material, may be any method. Specific examples of the contact methods include a method where fullerene powder is sprinkled over a surface of the host material, a method where the host material is air-tightly embedded in fullerene powder, a method where a compression-molded fullerene mold is rubbed on a surface of the host material, a method where fullerene dispersed or dissolved in water or an organic solvent is sprayed on a surface of the host material, a method where the dissolved fullerene is coated with a brush or the like on a surface of the host material and a method where a fullerene film is formed on a surface of the host material by means of a vacuum deposition method.

(ii) Heating Step (Step S12)

In the invention, a temperature at which a material brought into contact with fullerene is heated, as far as it is a temperature capable of forming a surface carburized layer on a surface of the host material, is not particularly restricted. As a specific example thereof, the upper limit thereof is 900° C. and preferably 800° C. When the upper limit is exceeded, superfluous energy is consumed to be uneconomical. Furthermore, the lower limit is 300° C., preferably 50° C. and more preferably 550° C. When the temperature is lower than the lower limit, sufficient carburization cannot be obtained. However, from the viewpoints of inhibiting crystal grains of the host material from overgrowing to result in deteriorating the mechanical strength and the like, a low temperature as far as possible within a temperature range capable of forming a surface carburized layer is preferably set. A temperature in the heating step and a time for applying the heating step are different depending on properties (composition, crystal structure and so on) of the iron-based metal material 1 as the host material where the surface carburized layer 2 is formed, and a desired carburization depth (depth of the carburized layer). However, along time heating under a high temperature environment results in coarser grains. Accordingly, from the viewpoint of inhibiting the mechanical strength from deteriorating or the like, a time of the heating step is preferably set shorter.

The fullerenes brought into contact with a surface of the host material react with the host material in the heating step to form a surface carburized layer. However, in general, it is rare that all the fullerenes brought into contact with the surface of the host material react with the host material. Usually, only a part of the fullerenes react and remaining fullerenes, without reacting with the host material, remain on a surface of the host material. On the other hand, when an atmosphere is made an inert atmosphere such as a nitrogen atmosphere, an argon atmosphere or the like, or a reducing atmosphere such as a hydrogen atmosphere, a hydrogen/nitrogen atmosphere or the like and a temperature is set at 300° C. or more, the fullerenes react each other to modify to form an amorphous carbon film. Accordingly, when the heating step is carried out under an inert atmosphere or a reducing atmosphere, the fullerenes staying on a surface of a carburized metal material are allowed reacting to form an amorphous carbon layer. Such the amorphous carbon layer, being excellent in the adhesiveness with the iron-based metal material 10, can be allowed working as a surface protective layer of the iron-based metal material 10.

On the other hand, when the heating step is carried out under an oxidizing atmosphere such as an oxygen atmosphere, an air atmosphere or the like, since the fullerenes that did not react with the iron-based metal material 10 are burnt, an iron-based metal material 10 that is not provided with an amorphous carbon layer may be produced. Other than the above, for instance, when the heating step is applied under an inert atmosphere, followed by further applying the heating step under an oxidizing atmosphere, an iron-based metal material that is, while provided with a thicker surface carburized layer, not provided with an amorphous carbon layer may be produced.

Thus, according to the invention, when the fullerenes are used as a carbon source, a reaction can be allowed proceeding at a lower temperature more than ever. Accordingly, crystal grains may be inhibited from overgrowing due to the carburization process and thereby a carburized material fine crystal grains may be produced. As the result, according to the invention, an iron-based metal material 10 having the characteristics such as the mechanical strength and toughness excellent more than ever can be produced.

3.2 Quenching Process (Step S20)

In a producing method of the invention involving an illustrated embodiment, after the carburization step S10, a quenching step S20 is provided. The step S20 is provided with at least a quenching step where a material carburized in the carburization step S10 (carburized material) is quenched.

A ferrite phase of an iron-based metal material 1 as the host material, which has a body-centered cubic structure (bcc structure) at normal temperature, when heated to a temperature equal to or more than an austenitizing temperature, is transformed into an austenite phase having a face-centered cubic structure (fcc structure). When the host material heated to the austenite phase region is quenched with for instance water or the like kept at substantially room temperature, a martensite transformation is caused to a martensite phase having a body-centered cubic structure. Thus, when a quenching process where an iron-based metal material heated to a high temperature is quenched to harden is applied, while maintaining the toughness inside of the material, on a surface thereof a hardened layer can be formed. Accordingly, the carburization process involving the embodiment is provided with a carburization step and a quenching step S20.

Here, the austenitizing temperature varies depending on a material composition. For instance, in the case that 0.8 mass percent of carbon make a solid solution with iron, when after heating up to a temperature of substantially 800° C., rapid cooling (quenching) is applied, a surface can be hardened. Only by the quenching process, in some cases, the material may be embrittled. Accordingly, from the viewpoints of establishing a balance between the material strength and the brittleness and so on, in accordance with applications and objects of the material, the quenching process is preferably applied. When a tempering process is applied after the quenching process, as a specific example of the tempering temperature, 100 to 700° C. or the like can be cited. Furthermore, in the producing method involving the invention, the quenching and tempering processes may be repeatedly applied.

In the description of the embodiment, a mode where, after the carburization step S10, the quenching step S20 is disposed was described. However, the invention, without restricting thereto, may be a mode where the quenching step S20 is not provided. However, from the viewpoints of hardening a surface layer formed by the carburization process and so on, a mode where, after the carburization step, the quenching step is provided is preferred.

4. Carbon Film and Preparing Method of Carbon Film

In the invention, a carbon film is formed when the granules of the fullerenes are thermally sprayed on a target material according to a thermal spraying method. The thermal spraying method, as far as it is a generally used thermal spraying method, is not particularly restricted. However, a method that can form particles into a film at a high velocity is preferred and when, a flame spraying process is used, a high velocity flame spraying process (HVOF) or a plasma spraying process under normal pressure or reduced pressure is preferred. As to the atmosphere, there is no problem even when the thermal spraying process is carried out under normal atmospheric pressure. However, in order to inhibit fullerenes from oxidizing and combusting, a low oxygen atmosphere, an inert atmosphere or a reduced pressure atmosphere is preferred. As the low oxygen atmosphere, a combustion exhaust gas atmosphere or the like can be cited, and, as the inert gas atmosphere, an argon, helium, nitrogen atmosphere or the like can be cited.

A film thickness is, though different depending on particle diameters of fullerenes used as a raw material and applications of the films, preferably in the range of 0.5 μm to 1 mm and more preferably in the range of 10 to 300 μm. The film thickness is appropriately controlled by a spraying amount of the fullerenes.

A material of a target substance to which the thermal spraying is applied may be metal, ceramics, plastics, glass or the like. A temperature of a target substance when the thermal spraying is applied is, though it may be raised due to radiation heat due to the thermal spraying, preferably in the range of from normal temperature to 700° C. When the temperature exceeds 700° C., the fullerenes may be unfavorably sublimed or combusted. When the temperature is lower than 700° C., the higher the temperature of the target substance is, immediately after the film forming, the more a reaction between the fullerenes and a surface of the target substance and between the fullerenes proceeds, thereby a dense carbon film is formed. Furthermore, even in the case of a temperature of the target substance being low, when the target substance is heated, after the thermal spraying, at a temperature in the range of 300 to 700° C., remaining fullerenes are reacted to form a carbon film.

When a prepared carbon film is measured by Raman spectroscopy, a broad peak of amorphous carbon is observed in the vicinity of 1200 to 1600 $cm^{-1}$. A peak derived from the fullerene is not utterly or only slightly observed. That is, a carbon film obtained in the invention is an amorphous carbon film substantially made of amorphous carbon.

The fullerene, different from nanocarbon materials such as nanocluster diamond and an onion-structured carbon, is made of molecules and a crystal thereof has a face-centered cubic structure. When the thermal spraying is carried out with relatively large aggregates of fullerenes as a raw material, although fullerenes on a surface of the aggregate are sublimed or combusted, since the thermal spraying is carried out at a high-speed, the fullerenes inside of the aggregate reach a surface of the material with a crystal structure maintained. Accordingly, it is considered that the fullerenes, when collided with a surface of the material at a high temperature and a high-speed, are plastically deformed, thereafter the fullerenes are modified owing to radiation heat of a metal surface, and thereby a smooth thick film of "carbon" is formed on a surface thereof. It must be paid attention in that the "carbon file" in the invention does not contain a film having a structure such as nanocluster diamond, an onion-structured carbon and the like.

EXAMPLES

In what follows, examples of the invention will be specifically described. Unless deviating from gist of the invention, the invention is not restricted to embodiments shown below.

1. Arrangement of Sample

In the beginning, a fullerene mixture (trade name, Nanom Mix, produced by Frontier Carbon Corporation, $C_{60}$; 61 mass percent, $C_{70}$: 25 mass percent, other higher molecular weight fullerene: 14 mass percent) was compression molded into a magnitude of 5 mm×5 mm×30 mm, thereby a fullerene molded body was obtained. On the other hand, as an iron-based metal material to be carburized, an iron piece obtained by cutting pure iron (purity: 99.99%) into a magnitude of 10 mm×10 mm×2 mm, followed by mirror polishing a surface thereof with alumina was used.

2. Preparation of Sample 2.1. Sample 1 (Example 1)

A fullerene molded body was rubbed on a surface of an iron piece to form a brownish fullerene film and thereby fullerene was adhered on a surface of the iron piece. The fullerene-adhered iron piece was put in a furnace heated at 300° C., heated to 700° C. within 133 min in an argon atmosphere, maintained there for 3 hr, and cooled over for 10 hr in a furnace where heating was stopped. Thereafter, the carburized iron piece was taken out of the furnace, a surface of the iron piece was washed with alcohol, and thereby a sample 1 involving example 1 was prepared. In what follows, a preparation process of a sample 1 will be described as a "process of example 1".

2.2. Sample 2 (Example 2)

An iron piece brought into contact with fullerenes according to a method similar to the carburized material involving example 1 was put into a furnace heated at 300° C., followed by heating up to 800° C. in an argon atmosphere within 167 min and by maintaining there for 3 hr, further followed by throwing in water (substantially 20° C.) to cool. Thereafter, a surface of the carburized iron piece was cleansed with alcohol, and, thereby a sample 2 involving example 2 was prepared. In what follows, a preparation process of the sample 2 will be described as "process of example 2".

2.3 Sample 3 (Example 3)

An iron piece brought into contact with fullerenes according to a method similar to the carburized material involving example 1 was put into a furnace at room temperature, followed by heating up to 600° C. in an argon atmosphere within 20 min and by maintaining there for 1 hr, further followed by cooling over 1 hr in a furnace where the heating was stopped. Thereafter, the carburized iron piece was taken out of the furnace and a surface thereof was cleansed with alcohol, and, thereby a sample 3 involving example 3 was prepared. In what follows, a preparation process of the sample 3 will be described as "process of example 3".

2.4. Sample 4 (Example 4)

An iron piece brought into contact with fullerenes according to a method similar to the carburized material involving example 1 was put into a furnace at room temperature, followed by heating up to 550° C. in an argon atmosphere within 18 min and by maintaining there for 1 hr, further followed by cooling over 1 hr in a furnace where the heating was stopped. Thereafter, the carburized iron piece was taken out of the furnace and a surface thereof was cleansed with alcohol, and, thereby a sample 4 involving example 4 was prepared. In what follows, a preparation process of the sample 4 will be described as "process of example 4".

2.5. Sample 5 (Comparative Example 1)

Graphite powder was rubbed on an iron piece to adhere the graphite on the iron piece. The graphite-adhered iron piece was put in a furnace heated at 300° C., followed by undergoing processes similar to that of example 1, and, thereby a sample involving comparative example 1 was prepared.

2.6. Sample 6 (Comparative Example 2)

Graphite powder was rubbed on an iron piece to adhere the graphite on the iron piece. Thereafter, by undergoing processes similar to that of example 2, a sample 6 involving comparative example 2 was prepared.

2.7. Sample 7 (Comparative Example 3)

Graphite powder was rubbed on an iron piece to adhere the graphite on the iron piece. Thereafter, by undergoing processes similar to that of example 3, a sample 7 involving comparative example 3 was prepared.

3. Analysis of Crystal Structure

With an X-ray diffractometer (X'Pert Pro MPD, produced by PAN Analytical Corporation) and under conditions of X-ray source: Cu Kα, output: 40 kV-30 mA, scanning axis: θ/2θ, measurement mode: continuous, measuring range: 2θ=5 to 90°, sampling width: 0.015, and counting time: 40.5 sec, a crystal structure of a surface of each of the carburized materials was analyzed.

According to the crystal structure analysis, from sample 1, peaks of α-iron and cementite ($Fe_3C$) were confirmed. That is, it was confirmed that, according to the process of example 1, a carburized material could be prepared.

On the other hand, according to the crystal structure analysis, from sample 2, peaks of a martensite structure were observed. That is, it was confirmed that, according to the process of example 2 as well, a carburized material could be prepared.

Furthermore, according to the crystal structure analysis, from sample 3, peaks of α-iron and cementite ($Fe_3C$) were confirmed. That is, it was confirmed that, according to the process of example 3, a carburized material could be prepared.

Still furthermore, according to the crystal structure analysis, from sample 4, peaks of α-iron and cementite ($Fe_3C$) were confirmed. That is, it was confirmed that, according to the process of example 4, a carburized material could be prepared.

Furthermore, according to the crystal structure analysis, from sample 5, peaks of α-iron were confirmed. That is, under the conditions involving the comparative example 1 where graphite powder was used as a carbon source, a carburized iron piece could not be obtained.

On the other hand, according to the crystal structure analysis, from sample 6, peaks of α-iron were confirmed. That is, under the conditions involving the comparative example 2 where graphite powder was used as a carbon source, a carburized iron piece could not be obtained.

Furthermore, according to the crystal structure analysis, from sample 7, peaks of α-iron were confirmed. That is, under the conditions involving the comparative example 3 where graphite powder was used as a carbon source, a carburized iron piece could not be obtained.

That is, from results of analysis of the crystal structure, it was found that, according to the invention, when the fullerenes were used as a carbon source, at temperatures lower than ever (550° C., 600° C., 700° C. and 800° C.) a carburization process could be applied.

4. Raman Spectrum Measurement

With a Raman spectrometer (NR-1800, produced by JASCO Corporation), under conditions of excitation wavelength; Ar 514.4 nm, measurement time: 60 sec×twice and resolving power: substantially 14 $cm^{-1}$, Raman spectra of the outermost surfaces of samples 3 and 6 were measured. A surface of sample 3 lacked metallic gloss and colored black. On the other hand, in sample 7, at the time of alcohol washing, graphite was peeled and on a surface metallic gloss was observed.

According to the Raman spectrum measurement due to the Raman spectrometer, in sample 3, a peak of the fullerene was not observed and a broad peak of amorphous carbon was observed in the vicinity of 1200 to 1600 $cm^{-1}$. That is, it was confirmed that, according to the process of the example 3, an amorphous carbon layer could be formed on the outermost surface of the carburized material.

On the other hand, owing to the Raman spectrum measurement with the Raman spectrometer, in sample 7, a peak of amorphous carbon was not observed. That is, under the conditions of the comparative example 3, where carbon powder was used as a carbon source, an iron piece provided with an amorphous carbon layer could not be obtained.

5. Element Distribution Analysis

By use of an electron probe microanalyzer (EPMA: JXA-8100, produced by JEOL Ltd.), with a W emitter as an electron gun, under conditions of accelerating voltage: 15 kV, irradiating current: 20 nA and beam diameter: 1 μm, an element distribution analysis of sample 3 was carried out. Results are shown in FIG. 3.

Figure 3:
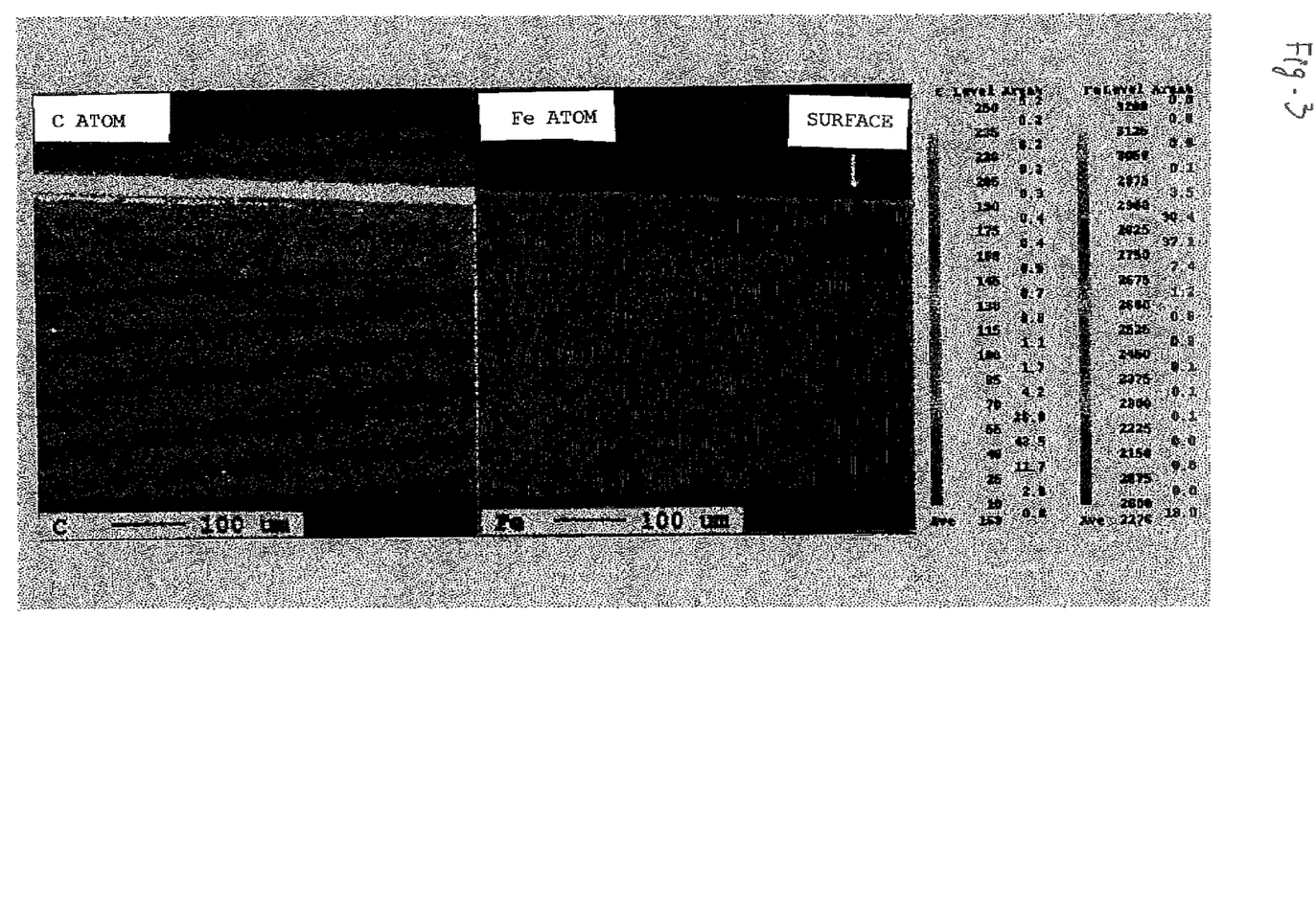
FIG. 3 is a photograph of a chart showing a measurement result of distribution states of carbon atoms and iron atoms of an iron-based metal material involving an embodiment of the invention.

When a sample 3 was cut, followed by polishing a cross section with alumina, further followed by carrying out an element distribution analysis due to the EPA, as shown in FIG. 3, carbon was found to intrude down to a depth of substantially 100 μm from the outermost surface. That is, it was found that, according to the process of the example 3, at such a low temperature as 600° C., the carburization proceeded down to 100 μm.

Sample 8 (Example 5)

On a surface of stainless steel SUS304, with fullerene granules as a raw material, under an argon atmosphere, DC arc plasma spraying was applied. A surface of the stainless steel was discolored due to the thermal spraying. As the fullerene granules, one prepared as spherical aggregates when a fullerene mixture (containing $C_{60}$: 60 mass percent, $C_{70}$: 22 mass percent, and other high molecular weight fullerene: 18 mass percent) was dissolved in 1,2,4-trimethyl benzene, followed by dropping methanol to crystallize was used. An average particle diameter of the fullerene mixture was 18 μm. The average particle diameter of the fullerene mixture is a value obtained as an average on the basis of volume when 2500 particles were observed by an optical micrometer, which were obtained by dispersing in methanol, followed by dropping on a filter.

With a Raman spectrometer (NR-1800, produced by JASCO Corporation), under conditions of excitation wavelength: Ar 514.4 nm, measurement time: 60 secxtwice and resolving power: substantially 14 $cm^{-1}$, a Raman spectrum of a surface of the stainless steel was measured. As the result, it was confirmed that, a peak of the fullerene was not observed and, in place thereof, a broad peak of amorphous carbon was observed in the vicinity of 1200 to 1600 $cm^{-1}$, that is, an amorphous carbon film was formed on a surface of the stainless steel.

Sample 9 (Example 6)

As fullerene granules, one obtained in such a manner that the fullerene granules of example 5 were molded into a planar shape with a molding machine, followed by grinder with a grinder machine, further followed by taking out granules of 150 μm or more and 500 μm or less by use of a sieve was used. An average particle diameter was 320 μm. Except that the granules were used as a raw material, similarly to a method of example 1, the thermal spraying was carried out. A surface of the stainless steel was discolored.

A Raman spectrum was measured of a surface of the stainless steel similarly to example 1. It was confirmed that, a peak of the fullerene was not observed and, in place thereof, a broad peak of amorphous carbon was observed in the vicinity of 1200 to 1600 $cm^{-1}$, that is, an amorphous carbon film was formed on a surface of the stainless steel.

Comparative Example 4

Except that graphite was used as a raw material, similarly to a method of example 1, the thermal spraying was carried out. When a Raman spectrum was measured of a surface of the stainless steel similarly to example 5, it was confirmed that, peaks of neither amorphous carbon nor graphite were observed, that is, graphite could not form a film on a surface of the stainless steel.

Comparative Example 5

Except that, as the fullerene granules, one obtained by pulverizing the fullerene granules of example 5 with a pulverizer was used, a similar method as example 1, the thermally spraying was applied. An average particle diameter of the pulverized and used fullerene granules was 2 μm. When a Raman spectrum was measured of a surface of the thermally sprayed stainless steel similarly to example 1, it was confirmed that, peaks of neither amorphous carbon nor graphite were observed, that is, graphite could not form a film on a surface of the stainless steel.

In the above, the invention was described with reference to embodiments considered at present most practical and most preferable. However, the invention is not restricted to embodiments disclosed in the specification, and, within a range that does not contradict gist or idea of the invention that can be read from claims and an entirety of a specification, can be appropriately modified. A metal material undergone such a modified carburization process, the metal material, a carbon film and a producing method thereof as well are included in a technical range of the invention.

The invention was detailed with reference to particular embodiments. However, it is obvious to persons familiar with the art that, without deviating from intentions and range of the invention, various modifications can be applied.

INDUSTRIAL APPLICABILITY

According to the invention, a metal material that is, without using expensive apparatus, carburized in a low temperature region where crystal grains do not grow so much, and a producing method of the metal material can be provided.

The invention claimed is:

1. A metal material mainly comprising iron, which comprises: a surface carburized layer having a higher carbon concentration than a center portion of the material; and an amorphous carbon layer on the outermost surface of the material wherein a surface of the metal material is subjected to a carburization process by a treatment using fullerenes as a carbon source and wherein a surface of said metal material is in contact with said amorphous carbon layer.

2. The metal material mainly comprising iron according to claim 1, wherein the carburization process is carried out under a temperature environment of 300° C. or more and 900° C. or less.

3. The metal material mainly comprising iron according to claim 1, wherein, after the carburization process, a quenching process is further carried out.

4. The metal material mainly comprising iron according to claim 1, which comprises, on the carburized surface, an amorphous carbon layer of a modified fullerenes.

5. The metal material mainly comprising iron according to claim 1, wherein as the fullerenes, granules of fullerenes having an average particle diameter in the range of 10 μm to 5 mm are used as a raw material.

6. A carbon film which is film-formed by a thermal spraying process using granules of fullerenes having an average particle diameter in the range of 10 μm to 5 mm as a raw material.

* * * * *

UNITED STATES PATENT AND TRADEMARK OFFICE
CERTIFICATE OF CORRECTION

PATENT NO. : 8,147,961 B2
APPLICATION NO. : 11/914899
DATED : April 3, 2012
INVENTOR(S) : Kyosuke Yoshimi et al.

Page 1 of 1

It is certified that error appears in the above-identified patent and that said Letters Patent is hereby corrected as shown below:

On the title page, Item (30), the Foreign Application Priority Data are omitted. Item (30) should read:

--(30) Foreign Application Priority Data

May 18, 2005 (JP).......................... 2005-145796
Sept. 6, 2005 (JP).......................... 2005-257537
Oct. 28, 2005 (JP).......................... 2005-314057--

Signed and Sealed this
Second Day of July, 2013

Teresa Stanek Rea
*Acting Director of the United States Patent and Trademark Office*